United States Patent
Cudak et al.

(10) Patent No.: US 9,311,341 B2
(45) Date of Patent: *Apr. 12, 2016

(54) COLLABORATIVE CAPTURE OF PHOTOGRAPHIC IMAGES

(71) Applicant: International Business Machines Corporation, Armonk, NY (US)

(72) Inventors: Gary D. Cudak, Creedmoor, NC (US); Christopher J. Hardee, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 14/221,447

(22) Filed: Mar. 21, 2014

(65) Prior Publication Data
US 2015/0271393 A1 Sep. 24, 2015

Related U.S. Application Data

(63) Continuation of application No. 14/219,177, filed on Mar. 19, 2014.

(51) Int. Cl.
*H04N 5/76* (2006.01)
*H04N 5/765* (2006.01)
(Continued)

(52) U.S. Cl.
CPC ........ *G06F 17/3028* (2013.01); *G06K 9/00677* (2013.01); *H04N 5/23222* (2013.01); *H04N 5/23293* (2013.01); *H04N 5/265* (2013.01); *H04N 5/77* (2013.01); *H04N 5/91* (2013.01); *H04N 9/8205* (2013.01); *H04W 4/028* (2013.01)

(58) Field of Classification Search
CPC ............. H04L 67/306; H04N 1/00132; H04N 1/00137; H04N 1/00148
USPC .......... 348/211.3, 211.1, 211.9, 231.2, 231.3, 348/552, 584, 180; 709/219; 701/454; 340/995, 24
See application file for complete search history.

(56) References Cited

U.S. PATENT DOCUMENTS 7,068,309 B2    6/2006  Toyama et al.
8,200,427 B2 *  6/2012  Cho et al. ...................... 701/426

(Continued)

OTHER PUBLICATIONS

TED Ideas worth spreading; "Blaise Agüera y Arcas: How PhotoSynth can connect the world's images", http://www.ted.com/talks/blaise_aguera_y_arcas_demos_photosynth.html, Nov. 21, 2013, 21 pages.

(Continued)

*Primary Examiner* — Jefferey Harold
*Assistant Examiner* — Jean W Desir
(74) *Attorney, Agent, or Firm* — Jeffrey L. Streets

(57) ABSTRACT

A method includes identifying a stored photographic image and metadata associated with the stored image, wherein the metadata includes a location and an orientation of a camera when the stored image was captured. The method further identifies a target photographic image to be requested, wherein a description of the target image is derived from the metadata of the stored image and includes a target location and a target orientation. The method monitors the location of a plurality of mobile communication devices and, in response to determining that a first mobile communication device is proximate to the target location, notifies the first mobile communication device of a request to capture the target photographic image, wherein the request includes the target location and the target direction.

19 Claims, 8 Drawing Sheets

(51) Int. Cl.
*G06F 17/30* (2006.01)
*H04N 5/265* (2006.01)
*G06K 9/00* (2006.01)
*H04N 5/232* (2006.01)
*H04N 5/91* (2006.01)
*H04W 4/02* (2009.01)
*H04N 5/77* (2006.01)
*H04N 9/82* (2006.01)

(56) References Cited

U.S. PATENT DOCUMENTS

| | | |
|---|---|---|
| 8,335,526 B2 | 12/2012 | Shankaranarayanan et al. |
| 8,416,309 B2 * | 4/2013 | Yoshimaru et al. ...... 348/211.99 |
| 2013/0166651 A1 | 6/2013 | Joshi |

OTHER PUBLICATIONS

Image::ExifTool::BuildTagLookup, "GPS Tags", Jul 22, 2013, 2 pages.

ip.com, "Method and System for Retrieving Stored Media from a Social Network", IPCOM000231059D, Sep. 25, 2013, 3 pages.

"Photo Tourism: Exploring Photo Collections in 3D", online Submission ID: 0184, Nov. 21, 2013, 11 pages.

Photography Stack Exchange, "Should I geotag the location of the subject or the photographer?" http://photo.stackexchange.com/questions (Photography Stack Exchange is a question and answer site for professional, enthusiast and amateur photographers. It's 100% free, no registration required), metadata—Should I geotag the location of the subject or the photographer? —Photography, May 5, 2011, 2 pages.

* cited by examiner

COLLABORATIVE CAPTURE OF PHOTOGRAPHIC IMAGES

CROSS-REFERENCE TO RELATED APPLICATIONS

This application is a continuation of U.S. patent application Ser. No. 14/219,177 filed on Mar. 19, 2014, which application is incorporated by reference herein.

BACKGROUND

1. Field of the Invention

The present invention relates to systems and methods for sharing and storing photographs.

2. Background of the Related Art

It has been said that a picture is worth a thousand words. People enjoy viewing and sharing pictures as a way of communicating, expressing themselves and being social. Photography in general has become extremely accessible with the development of digital cameras that can be included in a mobile communication device that is small enough to be kept with a person at all times. The ability to share those photographs has also improved along with wireless network coverage and speed, as well as the development and growth of online photo-sharing and social media services. As a result of all these developments, an individual may capture a photographic image at any time and immediately upload that photographic image over a wireless network to a photo-sharing service such that the photographic image may be shared with one person or a million people without requiring significant effort or technical training. Mobile applications that facilitate this type of photo-sharing have become very popular.

BRIEF SUMMARY

One embodiment of the present invention provides a method comprising identifying a stored photographic image and metadata associated with the photographic image, wherein the metadata includes a location and an orientation of a camera when the stored photographic image was captured. The method further comprises identifying a target photographic image to be requested, wherein a description of the target photographic image is derived from the metadata of the stored photographic image and includes a target location and a target orientation. The method then monitors the location of a plurality of mobile communication devices including a first mobile communication device, and determines whether the first mobile communication device is proximate to the target location. In response to determining that the first mobile communication device is proximate to the target location, the method notifies the first mobile communication device of a request to capture the target photographic image, wherein the request includes the target location and the target direction.

Another embodiment of the present invention provides a method comprising storing a plurality of photographic images on a computer readable data storage device, wherein each of the photographic images is associated with metadata including a location and an orientation of a camera when the photographic image was captured. The method further comprises using the metadata to map the location and orientation of the plurality of stored photographic images taken within a target geographic area, identifying a location and orientation within the target geographic area for which no photographic image is available, and preparing a description of a target photographic image to be requested, wherein the description of the target photographic image includes a target location and a target direction. The method monitors the location of a plurality of mobile communication devices including a first mobile communication device, and determines whether the first mobile communication device is proximate to the target location. In response to determining that the first mobile communication device is proximate to the target location, the method notifies the first mobile communication device of a request to capture the target photographic image, wherein the request includes the target location and the target direction.

DETAILED DESCRIPTION

Figure 1:
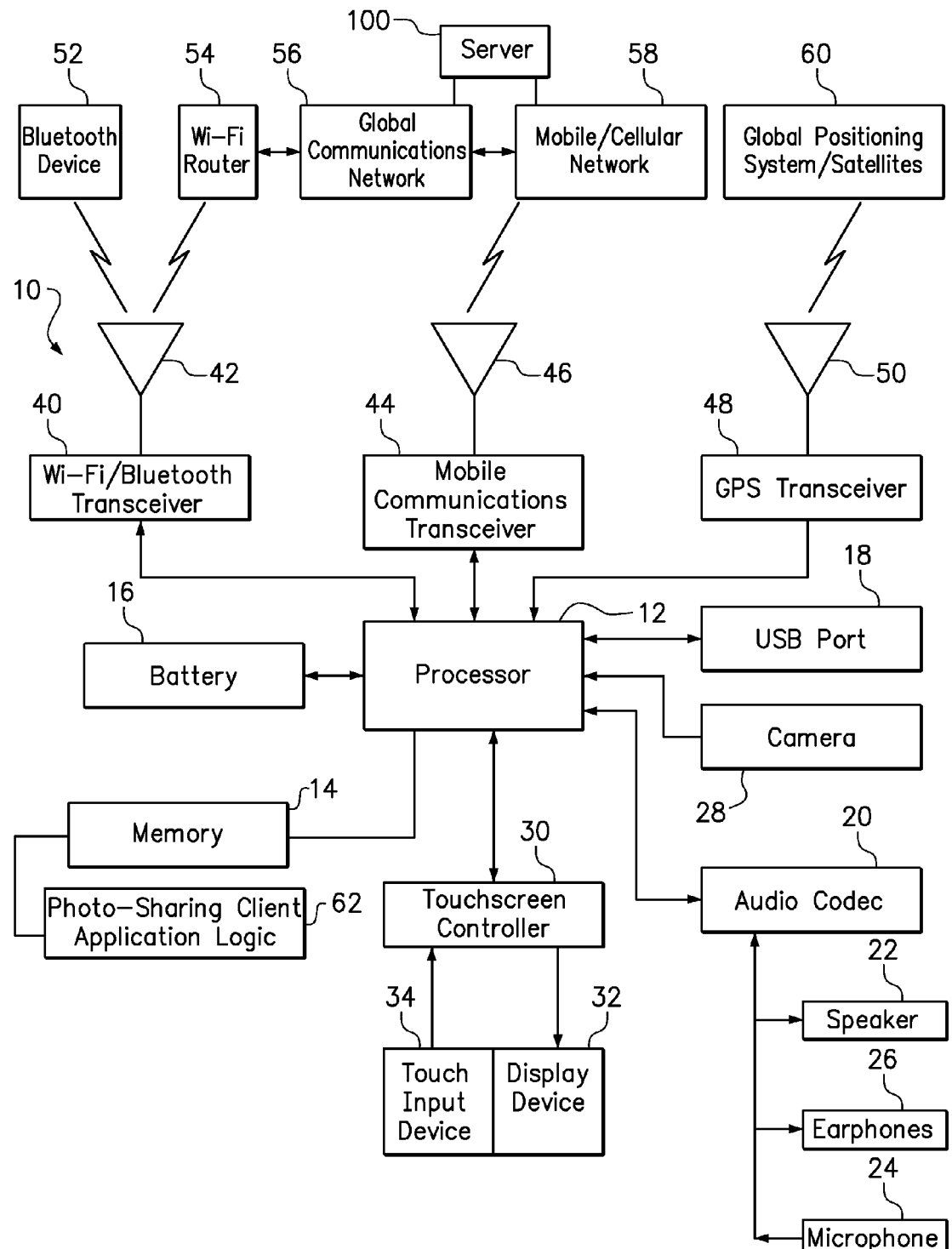
FIG. 1 is a diagram of a mobile communications device.

One embodiment of the present invention provides a method comprising identifying a stored photographic image and metadata associated with the photographic image, wherein the metadata includes a location and an orientation of a camera when the stored photographic image was captured. The method further comprises identifying a target photographic image to be requested, wherein a description of the target photographic image is derived from the metadata of the stored photographic image and includes a target location and a target orientation. The method then monitors the location of a plurality of mobile communication devices including a first mobile communication device, and determines whether the first mobile communication device is proximate to the target location. In response to determining that the first mobile communication device is proximate to the target location, the method notifies the first mobile communication device of a request to capture the target photographic image, wherein the request includes the target location and the target direction.

Digital photographic images may be stored on a computer readable storage medium, such as a hard disk drive or flash memory, and displayed on a display screen, such as a liquid crystal display. Photographic images that are originally captured using a digital camera may automatically store metadata in association with the photographic image. Nonlimiting examples of such metadata include the location where the photographic image was taken, the time and date when the photographic image was taken, and any other data that the digital camera is able to access and store. Presently, digital cameras are built into most mobile communication devices, also referred to as smart phones. These mobile communication devices have many other capabilities and the type and number of their capabilities is expanding rapidly. Commonly, a mobile communication device will include both a digital camera and global positioning system capabilities, such that the location where a photographic image was taken may be stored in terms of a standard coordinate system, such as longitude and latitude, measured by the GPS.

Still further, the metadata may include any data that can be captured directly or indirectly by the mobile communication device. Direct data capture may be obtained directly by sensors or components within the mobile communication device. For example, a microphone might measure a sound-level at the moment the photographic image was taken, or an accelerometer might measure movements of the mobile communication device at the same moment. Other direct data may be related to the digital camera settings used to take the photographic image, digital camera capabilities or specifications, or the digital file size, resolution or quality. Metadata captured indirectly by the mobile communication device may include data obtained by a wireless communication, such as a wireless mobile communication network or a wireless local area connection (LAN). Since wireless communication may provide the mobile communication device with a connection to a global communication network, such as the Internet, it is possible for the metadata to include any data available on the Internet. For example, while a mobile communication device could directly measure barometric pressure with an onboard barometer, the mobile communication device could also obtain that the current barometric pressure for the current location indirectly through a network connection with a weather service. With this network connection, the mobile communication device may be set up so that the current barometric pressure is obtained and stored in metadata along with each photographic image.

In addition, the metadata for any particular photographic image may be entirely or partially input manually or after the photographic image has been taken. This may be because the photographic image is a digital scan of a printed image or because the person adds metadata that is not available to the digital camera. For example, a person may enter a text description of the object, the occasion, or other observation or note. A database containing photographic images may have large number of photographic images that obtain their metadata from various sources.

In one implementation, the description of the target photographic image may differ from the metadata of the stored photographic image only by a designated time. For example, the target photographic image may be identified in a solicitation identifying the stored photographic image. The solicitation may originate with a user that has taken the stored photographic image and desires a photographic image of the same object or landscape at a different time of day, different time of year, different season, during a certain event, a year later, some range of time, or the like. In a specific example, a first person may have been travelling and taken a picture of a tree that was full of buds, but the flowers had not started blooming. If the first person provides the photographic image and the metadata identifying the location and orientation of the camera when the photographic image was taken, and solicits another person(s) to provide a similar image 7 days later when the flowers are in full bloom, another person that happens to be near that location at the right time may capture the requested target photographic image and make it available to the first user. Accordingly, the first user may obtain the desired photograph without having to travel back to the same location.

In various embodiments, the description of the target photographic image may be derived from the metadata of the stored photographic image so that the target photographic image will extend from the stored photographic image. For example, if a stored photographic image of a skyline was incomplete, the metadata from the skyline image may be used as the basis for a description of a target photographic image that would complete the skyline. More specifically, the metadata, identifying the location and orientation of the camera when the stored photographic image was taken, may be used to derive a target location and target orientation for taking the target photographic image. Other metadata may also be considered in such a derivation, such as the camera's wide angle/zoom settings, and portrait or landscape image. Still further, the description of the target photographic image may be derived from the metadata of the stored photographic image so that the target photographic image will fill a gap between the stored photographic image and a second stored photographic image. Most preferably, the target photographic image will contain some common content or overlap with the stored photographic image so that they can be aligned or at least confirm that the relationship between the images. It should be recognized that references to the orientation of a camera may include both direction (left/right, north/south/east/west, or angles therefrom) and height angle (up/down, horizontal/vertical, or angles therefrom).

The description of the target photographic image may further include an identification of a target object to be included in the target photographic image. The identification of the object may include a text description of the object or at least a portion of the stored photographic image, which may assist a user in taking the target photographic image in a manner that satisfies the request. For example, the text may describe that the object is any fireman in a city, a specifically-named celebrity, and the like. The description of the target photographic image may further include a camera setting, perhaps so that the target photographic image will intentionally match, or contrast with, the stored photographic image. Optionally, the description of the target photographic image may further include one or more environmental conditions (i.e., weather), wherein the first mobile communication device is only notified of the request to capture the target photographic image in response to prevailing conditions at the target location satisfy the one or more environmental conditions.

The method monitors the location of a plurality of mobile communication devices including a first mobile communication device, and determines whether the first mobile communication device is proximate to the target location. Location monitoring will typically require consent of each user of a mobile communication device, such that participation in the methods of the present invention is entirely voluntary and may require registration with a photo-sharing service or social media website.

In response to determining that a first mobile communication device is proximate to the target location, the method may notify the first mobile communication device of a request to capture the target photographic image, wherein the request includes the target location, the target orientation or direction of the camera, and any other necessary details. The notification may taken various forms, such as an electronic mail message, a pop up message, an audible or vibration alert, or any other form of notification that the user will allow. The user of the first mobile communication device may then access the description of the target photographic image.

In a further embodiment of the invention, the method may provide graphical instructions on a display screen of the first mobile communication device directing the user to move the first mobile communication device into the target location and direct the camera in the target direction. Such graphical instructions may be as simple as arrows pointing in the direction that the camera should be moved and directed. Optionally, the graphical instructions may include a map identifying the target location relative to a current location of the first mobile communication device. Still further, the first mobile communication device may provide additional graphic or audible output in response to the first mobile communication device having been moved into the target location and directed in the target direction. Accordingly, the user is alerted that the first mobile communication device is in position to take the target photographic image in accordance with the description.

Once taken, the target photographic image should be uploaded from the first mobile communication device, either to a network server, such as one maintained by a photo-sharing server, or directly to a user device that solicited the target photographic image via email or text message. The method may then receive and store the captured image from the first mobile communication device, wherein the captured image satisfies the description of the target photographic image. The target photographic image will preferable be stored along with its own metadata that may be subsequently used in accordance with the invention to identify further target photographic images.

Optionally, steps may be taken to verify that the image uploaded, received and stored satisfies the request. For example, object recognition or pattern recognition may be used to verify that the captured image received from the first mobile communication device satisfies the description of the target photographic image. The target photographic image may be otherwise compared with the stored photographic image to determine that the image satisfied the description of the target photographic image. Furthermore, the method may verify that metadata in the captured image received from the first mobile communication device satisfies the description of the target photographic image.

Another embodiment of the present invention provides a method comprising storing a plurality of photographic images on a computer readable data storage device, wherein each of the photographic images is associated with metadata including a location and an orientation of a camera when the photographic image was captured. The method further comprises using the metadata to map the location and orientation of the plurality of stored photographic images taken within a target geographic area, identifying a location and orientation within the target geographic area for which no photographic image is available, and preparing a description of a target photographic image to be requested, wherein the description of the target photographic image includes a target location and a target direction. The method monitors the location of a plurality of mobile communication devices including a first mobile communication device, and determines whether the first mobile communication device is proximate to the target location. In response to determining that the first mobile communication device is proximate to the target location, the method notifies the first mobile communication device of a request to capture the target photographic image, wherein the request includes the target location and the target direction. Optionally, the target geographic area may be selected on the basis of popularity of the area as measured by a number of attempts to view existing photographic images of the area, a frequency of online discussions about the area, an amount of available online content about the area, or the like.

One embodiment of the present invention provides a computer program product comprising a computer readable storage medium having program instructions embodied therewith, wherein the program instructions are executable by a processor to cause the processor to perform a method comprising identifying a stored photographic image and metadata associated with the photographic image, wherein the metadata includes a location and an orientation of a camera when the stored photographic image was captured. The method further comprises identifying a target photographic image to be requested, wherein a description of the target photographic image is derived from the metadata of the stored photographic image and includes a target location and a target orientation. The method then monitors the location of a plurality of mobile communication devices including a first mobile communication device, and determines whether the first mobile communication device is proximate to the target location. In response to determining that the first mobile communication device is proximate to the target location, the method notifies the first mobile communication device of a request to capture the target photographic image, wherein the request includes the target location and the target direction.

Another embodiment of the present invention provides a computer program product comprising a computer readable storage medium having program instructions embodied therewith, wherein the program instructions are executable by a processor to cause the processor to perform a method comprising storing a plurality of photographic images on a computer readable data storage device, wherein each of the photographic images is associated with metadata including a location and an orientation of a camera when the photographic image was captured. The method further comprises using the metadata to map the location and orientation of the plurality of stored photographic images taken within a target geographic area, identifying a location and orientation within the target geographic area for which no photographic image is available, and preparing a description of a target photographic image to be requested, wherein the description of the target photographic image includes a target location and a target direction. The method monitors the location of a plurality of mobile communication devices including a first mobile communication device, and determines whether the first mobile communication device is proximate to the target location. In response to determining that the first mobile communication device is proximate to the target location, the method notifies the first mobile communication device of a request to capture the target photographic image, wherein the request includes the target location and the target direction.

The foregoing computer program products may further include program instructions for implementing or initiating any one or more aspects of the methods described herein. Accordingly, a separate description of the methods will not be duplicated in the context of a computer program product.

FIG. 1 is a block diagram of the components in one example of a mobile communication device 10, such as a smart phone, capable of implementing embodiments of the present invention. The block diagram may be representative of any one or more mobile communication device in accordance with various embodiments of the present invention. The communication device 10 may include a processor 12, memory 14 that stores photo-sharing client application logic 62, a battery 16, a universal serial bus (USB) port 18, a camera 28, and an audio codec 20 coupled to a speaker 22, a microphone 24, and an earphone jack 26. The communication device 10 may further include a touchscreen controller 30 which provides a graphical output to the display device 32 and receives an input from a touch input device 34. Collectively, the display device 32 and touch input device 34 may be referred to as a touchscreen.

The communication device 10 may also include a Wi-Fi and/or Bluetooth transceiver 40 and corresponding antenna 42 allowing the device to communicate with a Bluetooth device 52 or a Wi-Fi router 54, a mobile communication transceiver 44 and corresponding antenna 46 allowing the device to communicate over a mobile/cellular network 58, and a global positioning system (GPS) transceiver 48 and corresponding antenna 50 allowing the device to obtain signals from a global positioning system or satellites 60. In a non-limiting example, the Wi-Fi router 54 and the mobile/cellular network 58 may be connected to a global communications network 56, such as the Internet. Furthermore, a server 100 running photo-sharing server application logic and storing photographic images, where the server 100 may be accessed by the mobile communication device 10 through the global communications network 56 and/or the mobile/cellular network 58.

Figure 2:
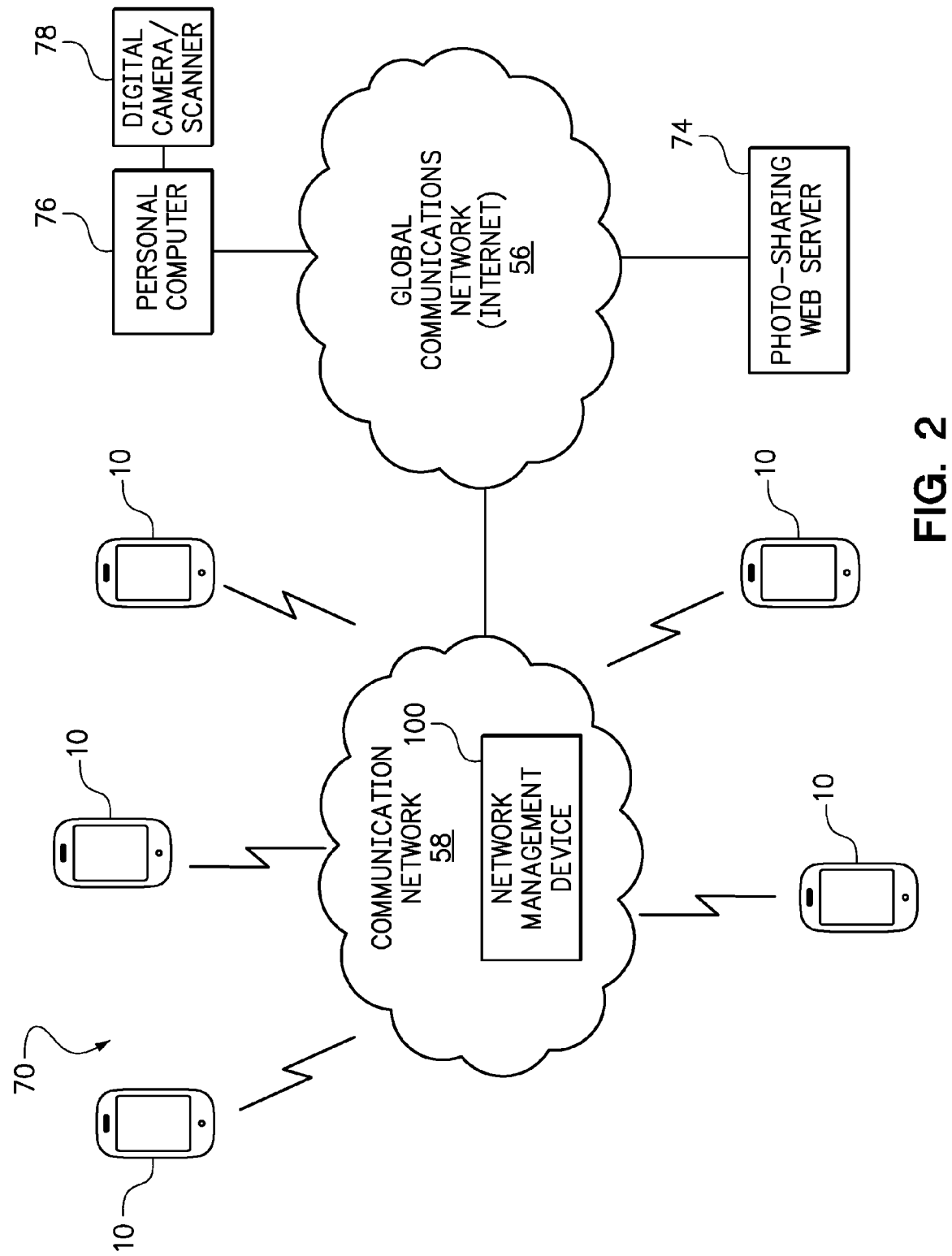
FIG. 2 is a diagram a plurality of mobile communication devices that may communicate over a communication network with a photo-sharing service.

FIG. 2 is a diagram of a system 70 including a communication network 58 enabling communication between a plurality of communication devices 10. The communication network 58 may be managed by a network management device 100. The network management device 100 may be responsible for establishing connections between communications devices, and may also provide one or more services to the communications devices. For example, although various steps of the invention may be implemented within a communication device 10, it is also possible to implement one or more steps of the methods or one or more functions of the program instructions of the present invention in the network management device 100. In one non-limiting example, the network management device 100 may monitor the location of one or more of the mobile communication devices 10 that are registered with photo-sharing service and have consented to participation.

The communication network 58 may also allow communication with servers and other devices over a global communications network 56, such as the Internet. Accordingly, a server 74 implementing a photo-sharing service or a social media web application may be accessed by the communication devices 10, or may be accessed by a personal computer 76. A given user may own and control a communication device 10 and a personal computer 76, and may access the photo-sharing web server 74 from either device. Accordingly, a user may establish and access a personal photo-sharing account using either device 10, 76. A database of photographic images and a history of participation in the photo-sharing service may be maintained on the individual devices 10, 76, on the photo-sharing web server 74 or one or more similar servers. While the mobile communication devices 10 may each include an onboard camera, the personal computer 76 may connect to an external digital camera and/or scanner 78 for providing digital image files to the personal computer 76. Furthermore, the computer 76 may interact with the photo-sharing web server 74 using either a photo-sharing client application or a web browser.

Figure 3:
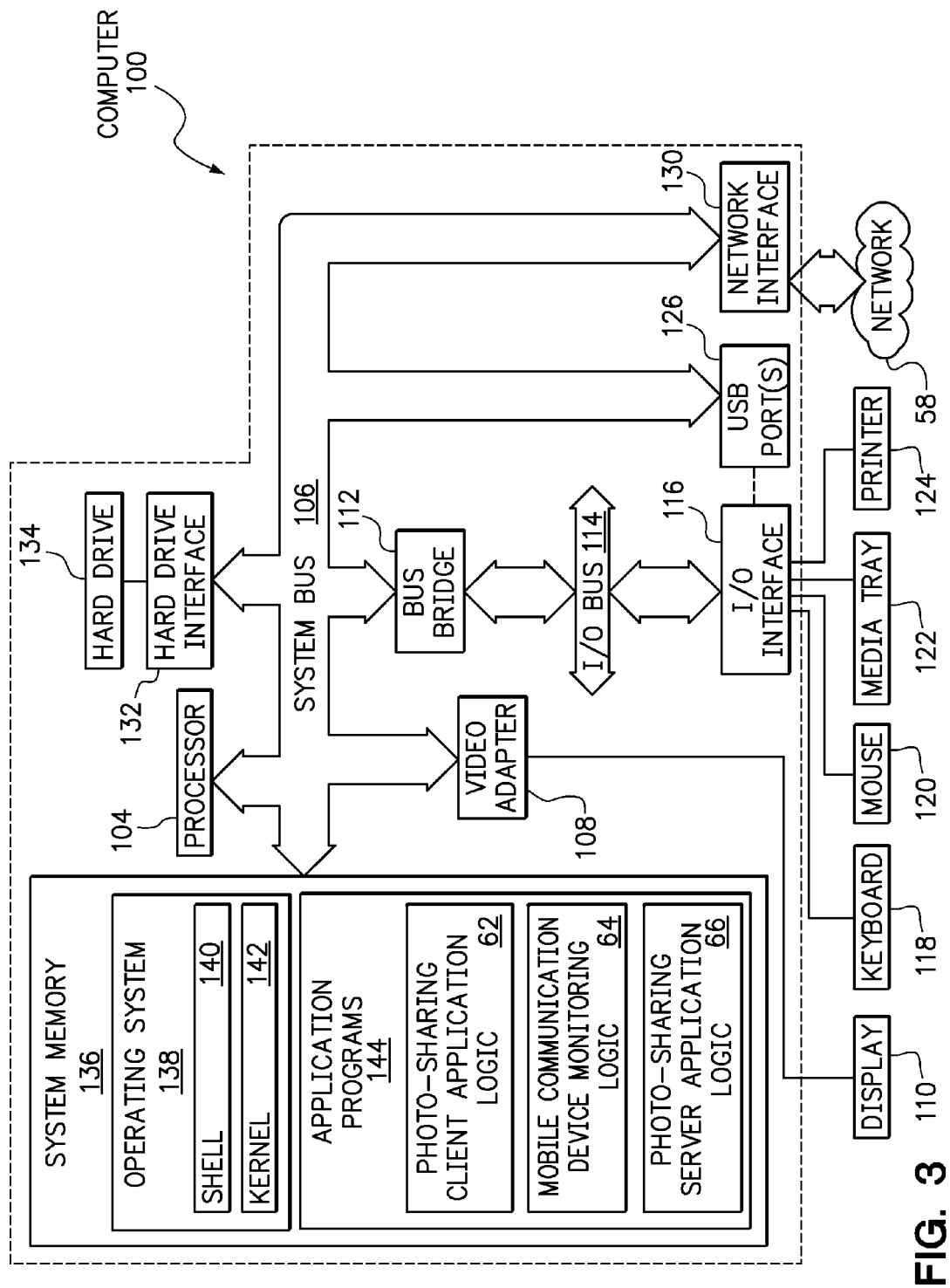
FIG. 3 is a diagram of a computer that may implement a photo-sharing service.

FIG. 3 is a diagram of an exemplary compute node or server (or simply "computer") 100 that may be utilized as the network management device 100, the personal computer 76, and/or the photo-sharing web server 74 consistent with embodiments of the present invention. The computer 100 includes a processor unit 104 that is coupled to a system bus 106. Processor unit 104 may utilize one or more processors, each of which has one or more processor cores. A video adapter 108, which drives/supports a display 110, is also coupled to the system bus 106. The system bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and USB port(s) 126. While the format of the ports connected to I/O interface 116 may be any known to those skilled in the art of computer architecture, in a preferred embodiment some or all of these ports are universal serial bus (USB) ports. As depicted, the computer 100 is able to communicate over a network 58 using a network interface 130. The network 58 may be an external network such as the cellular network or global communication network 56, and perhaps also an internal network such as an Ethernet or a virtual private network (VPN).

A hard drive interface 132 is also coupled to the system bus 106. Hard drive interface 132 interfaces with a hard drive 134. In a preferred embodiment, the hard drive 134 populates a system memory 136, which is also coupled to the system bus 106. System memory is defined as a lowest level of volatile memory in computer 100. This volatile memory includes additional higher levels of volatile memory (not shown), including, but not limited to, cache memory, registers and buffers. Data that populates system memory 136 includes an operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, the OS 138 also includes a kernel 142, which includes lower levels of functionality for the OS 138, including providing essential services required by other parts of OS 138 and application programs 144, including memory management, process and task management, disk management, and mouse and keyboard management. The application programs 144 in the system memory of computer 100 may include various programs and modules for implementing the methods described herein, such as the photo-sharing client application logic 62 (for use by the personal computer 76), mobile communication device monitoring logic 64 (for use by the network management device 100), or photo-sharing server application logic 66 (for use by the photo-sharing web server 74).

The hardware elements depicted in computer 100 are not intended to be exhaustive, but rather are representative components suitable to perform the processes of the present invention. For instance, computer 100 may include alternate memory storage devices such as magnetic cassettes, digital versatile disks (DVDs), Bernoulli cartridges, and the like. These and other variations are intended to be within the spirit and scope of the present invention.

Figure 4A:
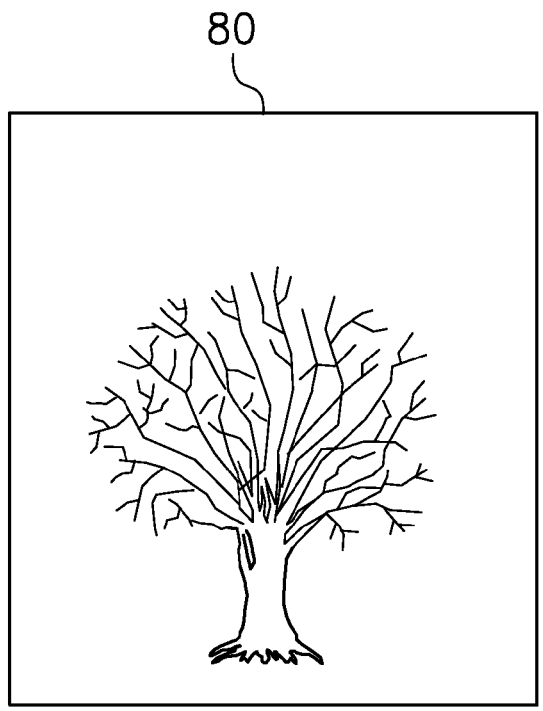
FIGS. 4A-4B are photographic images take at the same location of the same object in the same orientation, but at two different times.
Figure 4B:
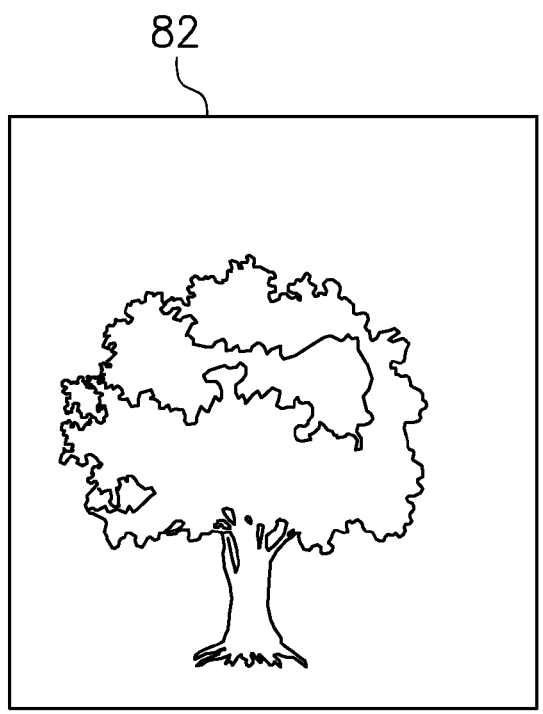

FIGS. 4A-4B are photographic images take at the same location of the same object in the same orientation, but at two different times. In FIG. 4A, a stored photographic image 80 includes an image of a tree having no leaves. Metadata associated with stored photographic image 80 would include a location, camera orientation, date, and other optional data. A registered user of a photo-sharing service may submit a solicitation for a target photographic image of the same tree at the same location and camera orientation, but during the spring or summer when the tree would be full with leaves. The photo-sharing service then prepares monitors for a registered user that is in the target location at the targeted time or time range and will send a notification to a registered user in response to their mobile communication device satisfying these conditions. Another registered user, or perhaps even the registered user that submitted the solicitation, found to be in the target location at the target time receives the notification and an associated description of the target photographic image, and, if they choose, will follow the description to capture the target photographic image 82 illustrated in FIG. 4B. The target photographic image 82 may then be uploaded to the photo-sharing server or to the soliciting user along with metadata showing the location, camera orientation, date and perhaps other data related to the photographic image 82.

Figure 5:
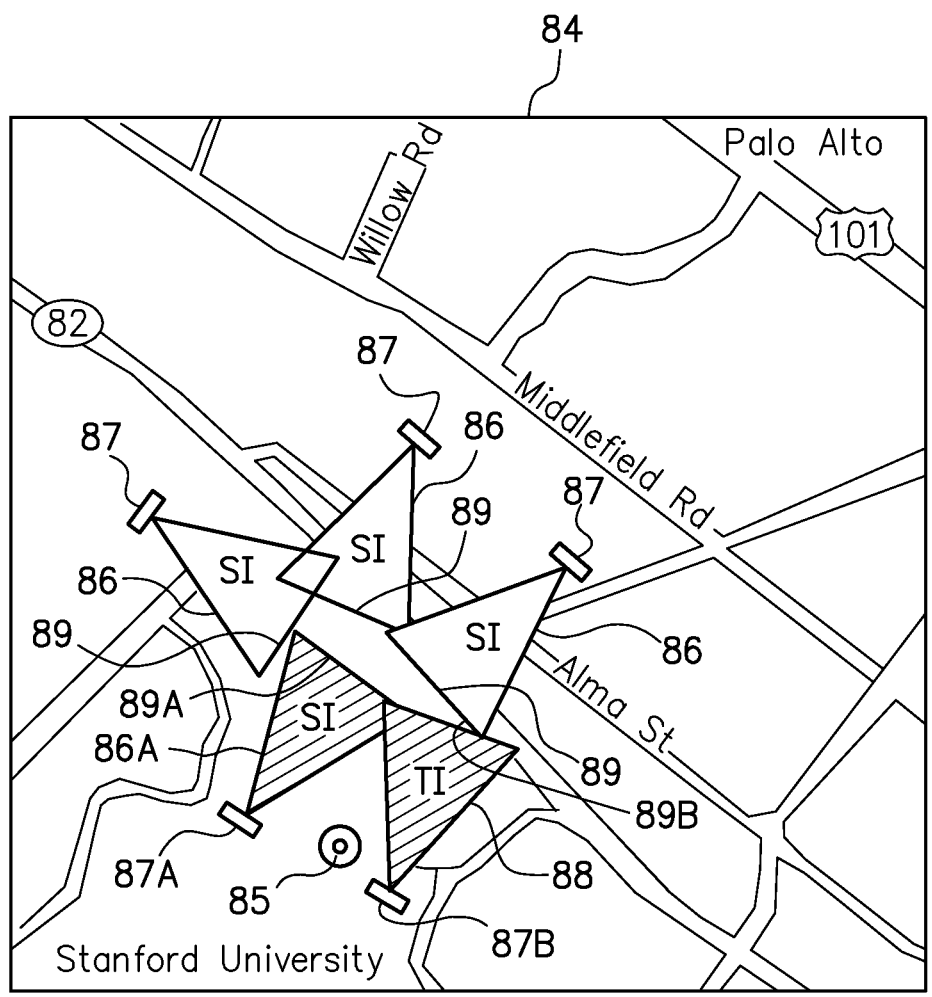
FIG. 5 is an illustration of a graphical user interface displaying a map of stored photographic images and showing the location and orientation of two target photographic images.

FIG. 5 is an illustration of a graphical user interface displaying a map 84 of four stored photographic images (SI) 86 and showing the location and orientation of a target photographic image 88. On the map 84, each photographic is illustrated as an icon showing a camera location 87 and a field of view 89. The currently detected location of a registered user's mobile communication device is shown as a circle 85. Due to the proximity of the mobile communication device's location (circle 85) to the target location 87B, a notification is sent to the mobile communication device providing a description of the target photographic image and requesting that the user move the device to the exact target location and capture the target photographic image for uploading. The orientation of the icon (camera 87B and field of view 89B) illustrate the target orientation of the camera to capture target photographic image. The description of the target photographic image that is provided to the mobile communication device identifies the target location, target camera orientation, and any other necessary details and description of the target photographic image.

Figure 6:
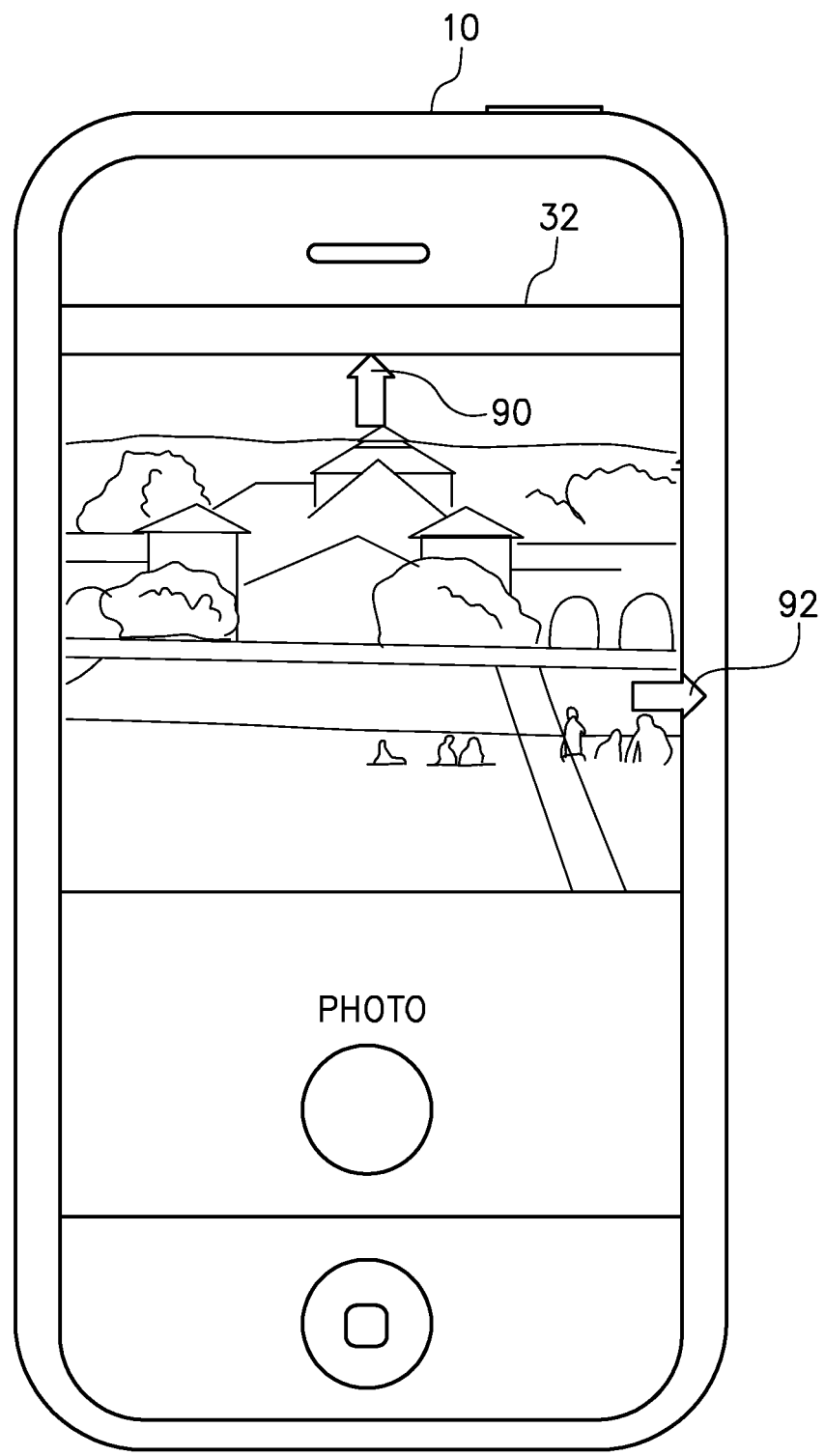
FIG. 6 is a diagram of a mobile communications device illustrating a display screen for interfacing with a user and displaying a live field of view of the onboard camera.

FIG. 6 is a diagram of a mobile communications device 10 illustrating a display screen 32 for interfacing with a user and displaying a live field of view of the onboard camera. In this illustration, the mobile communication device 10 has been moved from the location identified by the circle 85 on the map 84 of FIG. 5 to the target location 87A. As shown in FIG. 6, the display shows an image that represent the camera's current field of view. However, the display also includes an "up arrow" 90, which indicates that the camera should be tilted upward in order to match the target orientation, and a "right arrow" 92, which indicates that the camera should be turned to the right in order to match the target orientation.

Figure 7:
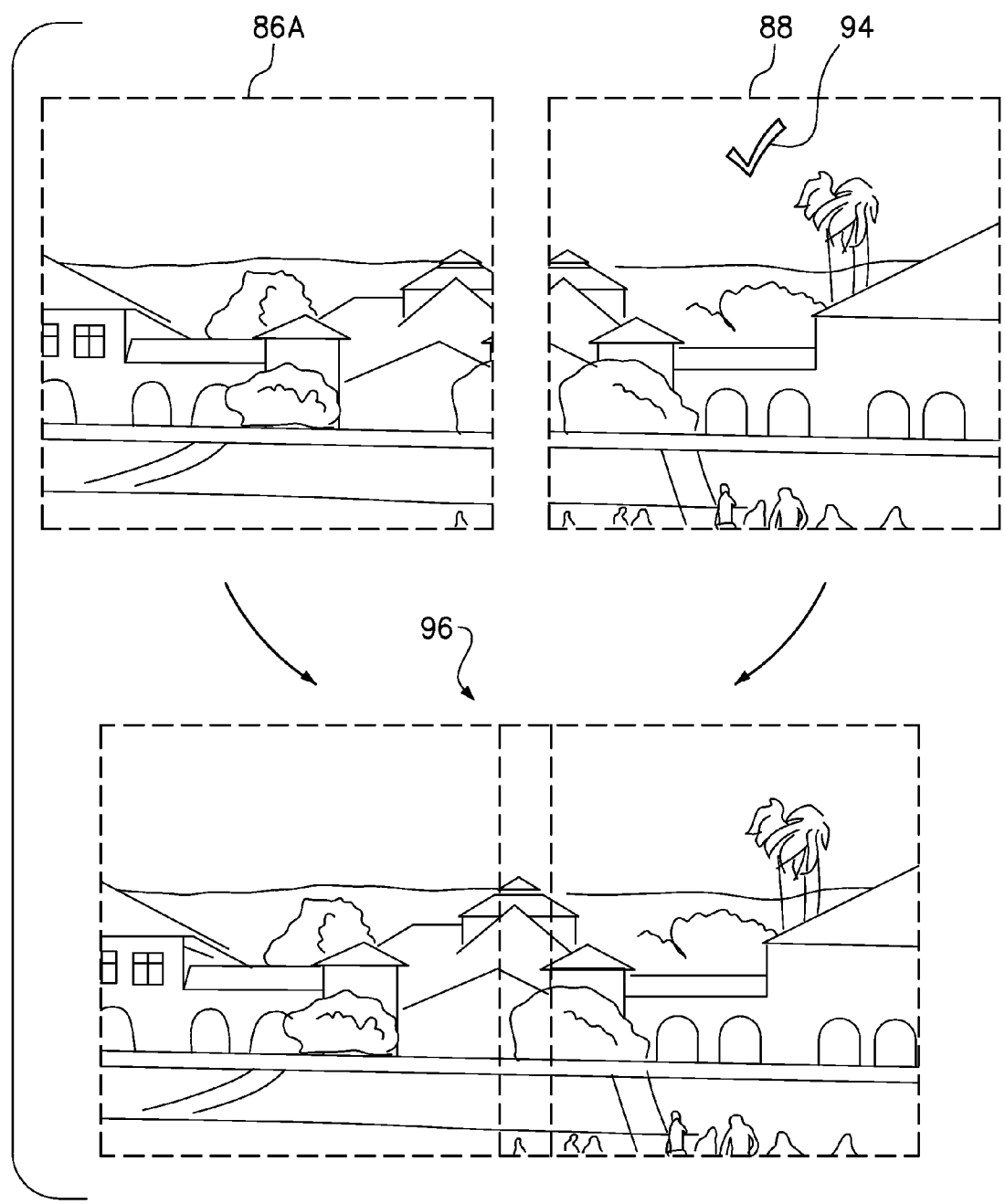
FIG. 7 is a diagram of a stored photographic image and an overlapping target photographic image.

FIG. 7 is a diagram of the stored photographic image 86A and the overlapping target photographic image 88. The relative positions of these two images 86A, 88 were shown on the map 84 of FIG. 5. A "check-mark" 94 is shown as it might be illustrated on the display screen 32 of the mobile communication device 10 in response to the device being in the target location and the camera being in the target orientation. However, the check-mark would not appear in the actual photographic image that is captured.

Once the target photographic image 88 has been uploaded, photographic processing software may use object recognition or pattern recognition to identify the overlapping portions of the two images and align them as shown in the combined image 96. In this and other manners, gaps in photographic images across a target geographic area, such as a college campus, may be identified and obtained from the mobile communication devices of one or more registered users. If one portion of the target geographic area is more popular or of greater general public interest, then the number and density of photographic images within the area may be increased.

Figure 8:
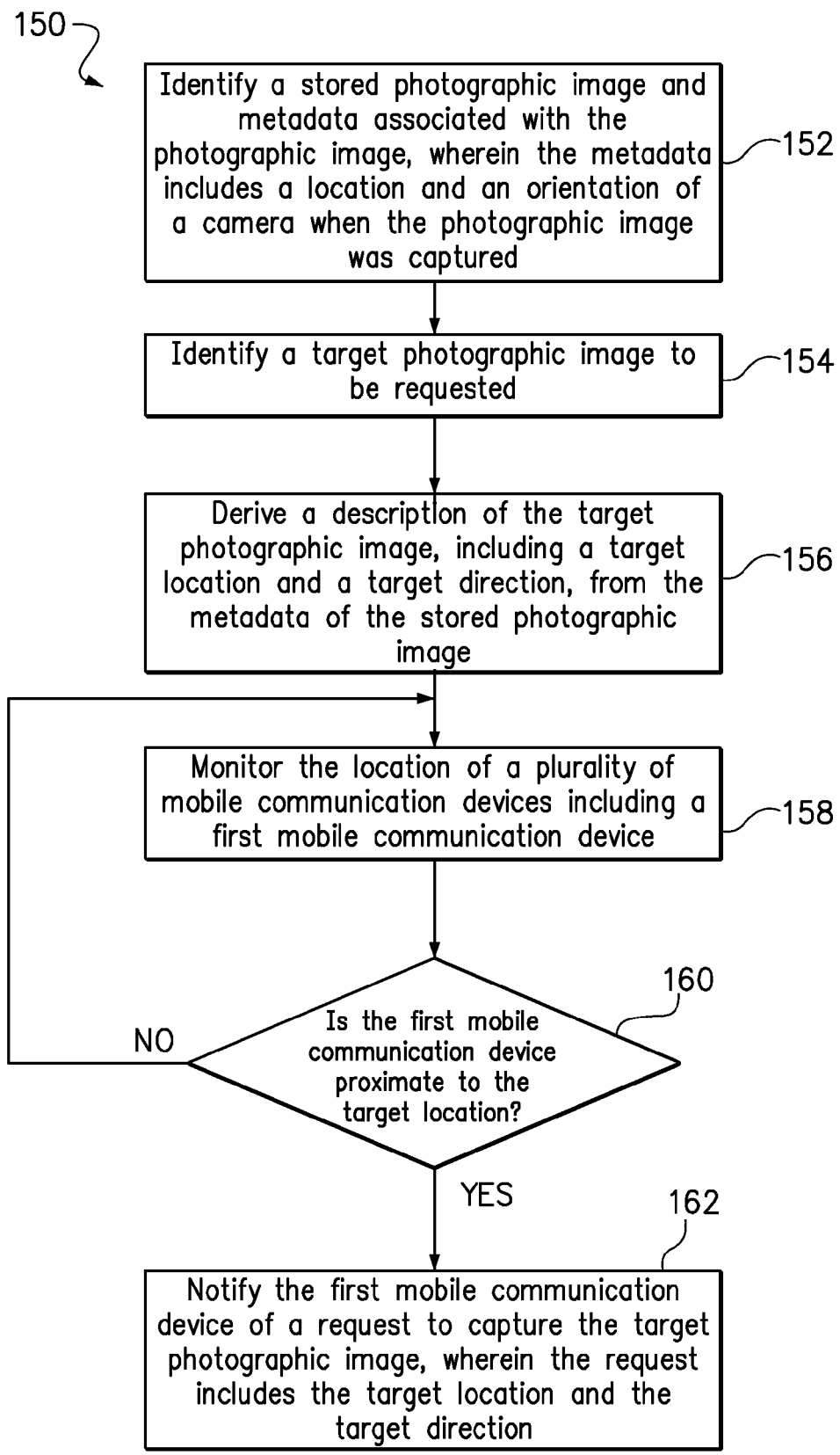
FIG. 8 is a flowchart of a method in accordance with one embodiment of the present invention.

FIG. 8 is a flowchart of a method 150 in accordance with one embodiment of the present invention. In step 152, the method identifies a stored photographic image and metadata associated with the photographic image, wherein the metadata includes a location and an orientation of a camera when the photographic image was captured. A target photographic image to be requested is identified in step 154, and a description of the target photographic image, including a target location and a target direction, is derived from the metadata of the stored photographic image in step 156.

In step 158, the method monitors the location of a plurality of mobile communication devices including a first mobile communication device. If it is determined in step 160 that the first mobile communication device is not proximate to the target location, then the method returns to step 158 in order to continue monitoring. However, if step 160 determines that the first mobile communication device is now proximate to the target location, then the method proceeds to step 162 and notifies the first mobile communication device of a request to capture the target photographic image, wherein the request includes the target location and the target direction.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   identifying a stored photographic image and metadata associated with the photographic image, wherein the metadata includes a location and an orientation of a camera when the photographic image was captured;
   identifying a target photographic image to be requested, wherein a description of the target photographic image is derived from the metadata of the stored photographic image and includes a target location and a target direction;
   monitoring the location of a plurality of mobile communication devices including a first mobile communication device;
   determining whether the first mobile communication device is proximate to the target location; and
   while the first mobile communication device is still proximate to the target location, notifying the first mobile communication device of a request to capture the target photographic image, wherein the request includes the target location and the target direction.

2. The method of claim 1, wherein the description of the target photographic image differs from the metadata of the stored photographic image only by a designated time.

3. The method of claim 2, wherein the target photographic image is identified in a solicitation identifying the stored photographic image.

4. The method of claim 1, wherein the description of the target photographic image is derived from the metadata of the stored photographic image so that the target photographic image will extend from the stored photographic image.

5. The method of claim 1, wherein the description of the target photographic image is derived from the metadata of the stored photographic image so that the target photographic image will fill a gap between the stored photographic image and a second stored photographic image.

6. The method of claim 1, wherein the description of the target photographic image further includes an identification of a target object to be included in the target photographic image.

7. The method of claim 6, wherein the identification of the object includes a text description of the object.

8. The method of claim 6, wherein the identification of the object includes at least a portion of the stored photographic image.

9. The method of claim 1, wherein the description of the target photographic image further includes a camera setting.

10. The method of claim 1, wherein the description of the target photographic image further includes one or more environmental conditions, and wherein the first mobile communication device is only notified of the request to capture the target photographic image in response to prevailing conditions at the target location satisfy the one or more environmental conditions.

11. The method of claim 1, further comprising:
receiving and storing a captured image from the first mobile communication device, wherein the captured image satisfies the description of the target photographic image.

12. The method of claim 11, further comprising:
using object recognition or pattern recognition to verify that the captured image received from the first mobile communication device satisfies the description of the target photographic image.

13. The method of claim 11, further comprising:
verifying that metadata in the captured image received from the first mobile communication device satisfies the description of the target photographic image.

14. The method of claim 1, further comprising:
providing graphical instructions on a display screen of the first mobile communication device directing the user to move the first mobile communication device into the target location and directed in the target direction.

15. The method of claim 14, wherein the graphical instructions include a map identifying the target location relative to a current location of the first mobile communication device.

16. The method of claim 14, further comprising:
the first mobile communication device providing graphic or audible output in response to the first mobile communication device having been moved into the target location and directed in the target direction.

17. A method, comprising:
storing a plurality of photographic images, wherein each of the photographic images is associated with metadata including a location and an orientation of a camera when the photographic image was captured;
using the metadata to map the location and orientation of the plurality of stored photographic images taken within a target geographic area;
identifying a location and orientation within the target geographic area for which no photographic image is available; and
preparing a description of a target photographic image to be requested, wherein the description of the target photographic image includes a target location and a target direction;
monitoring the location of a plurality of mobile communication devices including a first mobile communication device;
determining whether the first mobile communication device is proximate to the target location; and
while the first mobile communication device is proximate to the target location, notifying the first mobile communication device of a request to capture the target photographic image, wherein the request includes the target location and the target direction.

18. The method of claim 17, further comprising:
uploading the captured image from the first mobile communication device; and
storing the captured image in storage maintained by a photo-sharing service provider.

19. The method of claim 18, further comprising:
registering the plurality of mobile communication devices as voluntary contributors to the photo-sharing service.

* * * * *